(12) United States Patent
Steinmann et al.

(10) Patent No.: US 6,190,603 B1
(45) Date of Patent: Feb. 20, 2001

(54) PROCESS FOR PRODUCING MOULDINGS

(75) Inventors: Bettina Steinmann, Praroman; Friedrich Stockinger, Courtepin, both of (CH)

(73) Assignee: Novartis AG, Basel (CH)

( * ) Notice: Under 35 U.S.C. 154(b), the term of this patent shall be extended for 0 days.

(21) Appl. No.: 09/230,107

(22) PCT Filed: Jul. 19, 1997

(86) PCT No.: PCT/EP97/03894

§ 371 Date: Jan. 22, 1999

§ 102(e) Date: Jan. 22, 1999

(87) PCT Pub. No.: WO98/03319

PCT Pub. Date: Jan. 29, 1998

(51) Int. Cl.⁷ .......................... B29C 35/08; B29D 11/02; C08F 2/46
(52) U.S. Cl. .......................... 264/496; 264/1.38; 264/2.6; 264/1.7; 264/494; 264/343; 522/162; 522/163; 522/164; 522/165; 522/166; 522/167
(58) Field of Search .................................. 264/1.38, 2.6, 264/494, 496, 331.11, 1.7, 343; 522/162, 163, 164, 165, 166, 167

(56) References Cited

U.S. PATENT DOCUMENTS

| 4,923,906 | * | 5/1990 | Mueller et al. | 523/107 |
|---|---|---|---|---|
| 5,028,358 | | 7/1991 | Blum | 264/1.4 |
| 5,079,319 | | 1/1992 | Mueller | 526/238.23 |
| 5,304,584 | | 4/1994 | Nunze et al. | 523/106 |
| 5,415,816 | * | 5/1995 | Buazza et al. | 264/1.38 |
| 5,516,468 | * | 5/1996 | Lipscomb et al. | 264/1.38 |
| 5,656,210 | * | 8/1997 | Hill et al. | 264/2.6 |
| 5,667,735 | * | 9/1997 | Bae et al. | 264/1.7 |
| 5,880,171 | * | 3/1999 | Lim et al. | 523/106 |

FOREIGN PATENT DOCUMENTS

| 0 537 877 A2 | 4/1993 | (EP) . |
|---|---|---|
| WO 90/13413 | 11/1990 | (WO) . |
| WO 92/12851 | 8/1992 | (WO) . |

* cited by examiner

Primary Examiner—James J. Seidleck
Assistant Examiner—Sanza L. McClendon
(74) Attorney, Agent, or Firm—R. Scott Meece; Robert J. Gorman, Jr.

(57) ABSTRACT

A novel process for producing mouldings, especially contact lenses, is described, comprising the following steps: a) introducing into a mould a prepolymer containing photo crosslinkable groups that is liquid at room temperature or is readily meltable and is substantially free of solvents; b) initiating the photo cross-linking for a period of <20 minutes; c) opening the mould, so that the moulding can be removed for the mould. In accordance with the process according to the invention, it is possible especially to produce contact lenses having valuable properties.

20 Claims, No Drawings

PROCESS FOR PRODUCING MOULDINGS

The invention relates to a novel process for producing mouldings, especially opthalmological mouldings, such as especially contact lenses, in which a liquid or readily meltable prepolymer containing crosslinkable groups is crosslinked in the absence of solvents, and to the further processing thereof to form ready-to-use contact lenses.

Processes for producing mouldings, especially contact lenses, by suitable crosslinking of polymers containing crosslinkable groups are known. The previously known processes are customarily carried out in the presence of a solvent and optionally with the addition of vinyl comonomers. For the production of a ready-to-use contact lens it is accordingly often necessary to replace the solvent when the crosslinking is complete and/or to extract unreacted monomers. There is therefore a need for a simplified process for producing mouldings that can be carried out without solvent and does not include an extraction step.

The present Application therefore relates to a process for producing mouldings that comprises the following steps:
a) introducing into a mould a prepolymer containing photocrosslinkable groups that is liquid at room temperature or is readily meltable and is substantially free of solvents,
b) initiating the photocrosslinking for a period of <20 minutes,
c) opening the mould, so that the moulding can be removed from the mould.

The criterion that the prepolymer be liquid or readily meltable is to be understood according to the invention as meaning that the prepolymer is liquid at room temperature or has a melting point of $\leq 100°$ C., preferably $\leq 75°$ C. and especially $\leq 50°$ C. Preferred for the process according to the invention are prepolymers that are liquid at room temperature.

The polymeric base structure of the prepolymers can belong to a wide variety of classes of polymer; examples are polyethers, polyesters, polyureas, polyurethanes, polycarbonates and polyamides. Also possible are homogeneous mixtures of two or more different polymers.

When the prepolymer is a polyether, then, for example, a polyalkylene glycol homo- or co-polymer or a polytetrahydrofuran comes into consideration. Examples of suitable polyalkylene glycol homo- or co-polymers are $C_1$–$C_6$ polyalkylene glycol homopolymers or block copolymers and preferably polymers based on polyethylene glycol or polypropylene glycol or polyethylene glycol/polypropylene glycol block copolymers.

Preference is given to the use of a polyester, polyamide, polyamide with polyethylene glycol blocks, polyurethane, polyurea or of one of the above-mentioned polyethers as prepolymer.

The prepolymer used according to the invention must also contain photocrosslinkable groups. Photocrosslinkable groups are to be understood as being customary photocrosslinkable groups well known to the person skilled in the art, especially those such as have already been proposed for the production of contact lens materials. They include especially, but not exclusively, groups containing carbon-carbon double bonds. In order to demonstrate the wide variety of suitable crosslinkable groups, there may be mentioned here as crosslinking mechanisms, merely by way of example, radical polymerisation, 2+2-cycloaddition, Diels-Alder reaction, ROMP (Ring Opening Metathesis Polymerisation), vulcanisation, cationic crosslinking and epoxy curing. Suitable photopolymerisable groups are especially radically or cationically polymerisable groups.

Suitable radically crosslinkable groups correspond, for example, to formula $$P_1\text{—}(Y)_m\text{—}(R\text{—}X)_p\text{—} \quad (1),$$

wherein
$P_1$ is a radically crosslinkable group,
Y is the radical —CONHCOO—, —CONHCONH—, —OCONHCO—, —NHCONHCO—, —NHCO—, —CONH—, —NHCONH—, —COO—, —OCO—, —NHCOO— or —OCONH—,
m and p are each independently of the other the number 0 or 1,
R is the residue of a divalent organic compound having from 1 to 20 carbon atoms, and
X is the radical —NHCO—, —CONH—, —NHCONH—, —COO—, —OCO—, —NHCOO— or —OCONH—.

$P_1$ is, for example, alkenyl, which is unsubstituted or substituted, for example, by $C_1$–$C_4$-alkoxycarbonyl or by vinyloxycarbonyl, or alkenylaryl or alkenylarylenealkyl, the said radicals each having up to 20 carbon atoms. Examples of alkenyl are vinyl, $C_1$–$C_4$alkoxycarbonylvinyl, vinyloxycarbonylvinyl, allyl, 1-propen-2-yl, 1-buten-2-, -3- or -4-yl, 2-buten-3-yl and straight-chain or branched pentenyl, hexenyl, octenyl, decenyl and undecenyl. Examples of alkenylaryl are vinylphenyl, vinyinaphthyl and allylphenyl. Examples of alkenylarylenealkyl are o-, m- and p-vinylbenzyl.

$P_1$ is preferably alkenyl or alkenylaryl each having up to 12 carbon atoms, especially alkenyl having up to 8 carbon atoms and more especially alkenyl having up to 4 carbon atoms.

Y is preferably —COO—, —OCO—, —NHCONH—, —NHCOO—, —OCONH—, —NHCO— or —CONH—, especially —COO—, —OCO—, —NHCO— or —CONH— and more especially —COO— or —OCO—.

X is preferably —NHCONH—, —NHCOO— or —OCONH— and especially —NHCOO— or —OCONH—.

The variables m and p are preferably not both the number 0. When p is 0, m is preferably the number 1.

R is preferably alkylene, arylene, cycloalkylene having from 6 to 20 carbon atoms, arylene-alkylene, alkylenearylene, alkylenearylenealkylene or arylenealkylenearylene. R is especially a divalent radical having up to 12 carbon atoms and more especially a divalent radical having up to 8 carbon atoms. R is preferably alkylene or arylene having up to 12 carbon atoms, especially alkylene having up to 6 carbon atoms and more especially alkylene having up to 4 carbon atoms.

Preferred as radically crosslinkable groups are acryloyl, methacryloyl, maleate, vinyl ether maleate, styryl, acrylamido, methacrylamido, acrylamidoalkyl, urethane methacrylate or unsubstituted or substituted derivatives of the mentioned radicals, with special preference being given to acryloyl, methacryloyl, acrylamido and methacrylamido.

Especially preferred radically crosslinkable groups correspond to formula (1) above wherein $P_1$ is alkenyl having up to 4 carbon atoms, Y is —COO— or —CONH—, R is alkylene having up to 4 carbon atoms, X is —NHCOO—, and m and p are each independently of the other 0 or 1, the sum of (m+p) being $\geq 1$.

Cationically crosslinkable groups that may be mentioned are, for example, epoxy, vinyl ether, propenyl ether, spiroorthoester and spiroorthocarbonate groups and cyclic carbonates, with epoxy or vinyl ether groups being preferred.

When the cationically crosslinkable group is an epoxy group, that epoxy group corresponds, for example, to formula $$P_2-Y_1- \quad (2),$$

wherein
$P_2$ is the residue of an organic epoxy-group-containing compound and
$Y_1$ is the radical —NHCO—, —CONH—, —NHCONH—, —COO—, —OCO—, —NHCOO— or —OCONH—.

Examples of suitable residues $P_2$ correspond to the formula

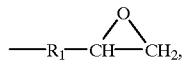
(3a)

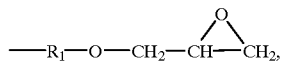
(3b)

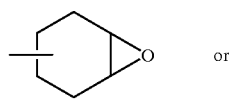
or (3c)

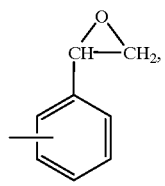
(3d)

wherein
$R_1$ and $R_2$ are each independently of the other $C_1$–$C_6$alkylene.
$Y_1$ is preferably —COO—, —OCO—, —NHCO— or —CONH—.

Preferred as photocrosslinkable groups are radically polymerisable groups containing carbon-carbon double bonds, especially acryloyl, methacryloyl, acrylamido or methacrylamido.

A preferred group of prepolymers used according to the invention corresponds to the formula

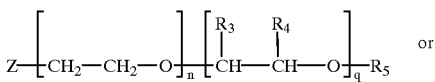
or (4)

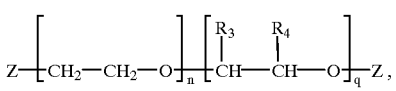
(5)

wherein
one of the radicals $R_3$ and $R_4$ is hydrogen and the other is methyl, $R_5$ is hydrogen or $C_1$–$C_{30}$-alkyl, n and q are each independently of the other a number from 0 to 100, the sum of (n+q) being $\geq 5$, and Z is a photocrosslinkable radical, preferably one of the photocrosslinkable radicals mentioned above, with the said preferences applying. Z in formulae (4) and (5) is preferably a radical of formula (1) or (2) above and is especially acryloyl, methacryloyl, acrylamido or methacrylamido or is a radical of formula (2) above wherein $Y_1$ is —COO—, —OCO—, —CONH— or —NHCO— and $P_2$ is a residue of formula (3a)–(3d) above.

The prepolymer used according to the invention contains crosslinkable groups preferably in an amount of from approximately 0.5 to approximately 80% equivalents, based on the equivalents of monomers forming the polymeric base structure, especially approximately from 1 to 50%, more especially approximately from 1 to 25%, preferably approximately from 2 to 15% and especially approximately from 3 to 10%. Special preference is given also to amounts of crosslinkable groups of from approximately 0.5 to approximately 25% equivalents, especially approximately from 1 to 15% and more especially approximately from 2 to 12%, based on the equivalents of monomers forming the polymeric base structure.

The prepolymers used according to the invention are, as mentioned above, crosslinkable but are uncrosslinked or at least substantially uncrosslinked.

The average molecular weight of the prepolymers can vary within wide limits, provided that they are liquid or readily meltable and crosslinkable. An average molecular weight of, for example, from 1000 to 50,000 has proved advantageous for the prepolymers used according to the invention.

In the process according to the invention the prepolymers are advantageously used in pure form, that is to say free of undesirable constituents. Undesirable constituents are to be understood in this context as being especially physiologically undesirable constituents, for example monomeric, oligomeric or polymeric starting compounds used for the preparation of the prepolymer, or secondary products formed during the preparation of the prepolymer. The content of those undesirable constituents in the prepolymers is preferably $\leq 0.001\%$ and especially $\leq 0.0001\%$ (1 ppm). The prepolymers may, for example as a result of their synthesis, additionally contain constituents that are acceptable from the physiological stand-point, for example sodium chloride, such constituents advantageously being present in an amount of $\leq 1\%$, preferably $\leq 0.1\%$, and especially $<0.01\%$.

The prepolymers used in the process according to the invention may, if necessary, first be subjected to purification. The purification of the prepolymers can be effected in a manner known per se, for example by precipitation with organic solvents, such as acetone, filtration and washing, extraction in a suitable solvent, dialysis or ultrafiltration, with special preference being given to ultrafiltration. By means of that purification operation it is possible to obtain the prepolymers in an extremely pure form, for example free or at least substantially free of reaction products, such as salts, and of starting materials, for example non-polymeric constituents.

The preferred process for purifying the prepolymers used in the process according to the invention, i.e. ultrafiltration, can be carried out in a manner known per se. It is also possible to carry out such ultrafiltration repeatedly, for example from two to ten times. The ultrafiltration may alternatively be carried out continuously until the desired degree of purity has been achieved. The degree of purity can in principle be as high as desired.

The prepolymers used according to the invention are known per se and some of them are commercially available or can be obtained in a manner known per se from known precursor products, for example by the reaction of the base polymer with a compound containing one of the mentioned photocrosslinkable groups and a group capable of bonding to the base polymer, for example a carboxy, carbamoyl, carboxylic acid ester, carboxylic acid anhydride, amino or hydroxy group. Examples of such compounds capable of bonding to the base polymer and containing a photocrosslinkable group are (meth)acrylic acid esters, (meth)acrylamide and derivatives of a cyclohexenoxidecarboxylic acid, for example a corresponding ester or an acid halide.

The liquid or readily meltable prepolymers can be introduced into a mould using processes known per se, such as especially conventional metering in, for example dropwise introduction. Neither before nor during or after introduction into the mould are solvents, comonomers, for example vinyl comonomers, or further auxiliaries added to the prepolymer or prepolymer mixture, except that a photoinitiator may be added if appropriate.

Appropriate moulds are manufactured, for example, from polypropylene. Suitable materials for reusable moulds are, for example, quartz, sapphire glass and metals.

When the mouldings to be produced are contact lenses, they can be manufactured in a manner known per se, for example in a conventional "spin-casting-mold", as described, for example, in U.S. Pat. No. 3,408,429, or in accordance with the so-called full-mold process in a static mould, as described, for example, in U.S. Pat. No. 4,347,198.

The photocrosslinking can be initiated in the mould, for example by actinic radiation, such as, for example, UV light, or ionising radiation, such as, for example, gamma radiation or X-rays.

The photocrosslinking is advantageously carried out in the presence of a photoinitiator capable of initiating, for example, radical or cationic crosslinking. Examples thereof are familiar to the person skilled in the art; there may be mentioned specifically as suitable radical photoinitiators benzoin methyl ether, 1-hydroxycyclohexyl phenyl ketone, Darocure 1173 and Irgacure types and, as cationic photoinitiators, Cyracure types. The photoinitiator is advantageously added to the prepolymers before introduction into the mould, preferably by mixing the prepolymers and the photoinitiator together. The amount of photoinitiator can be selected within wide limits, an amount of up to 0.05 g/g of prepolymer, and especially up to 0.003 g/g of prepolymer, having proved advantageous.

It should be emphasised that according to the invention the crosslinking can be effected in a very short time, for example in <20 minutes, advantageously in ≦10 minutes, preferably in ≦8 minutes, especially in ≦5 minutes, more especially in ≦1 minute and especially in ≦30 seconds.

The photocrosslinking is, as already mentioned, carried out in the absence of solvents, vinyl comonomers or other auxiliaries, with the exception of a photoinitiator which may be present.

The opening of the mould, so that the moulding can be removed from the mould, can be carried out in a manner known per se.

A preferred embodiment of the process according to the invention comprises the following steps:
a) introducing into a mould, together with a photoinitiator, a prepolymer that is liquid at room temperature or has a melting point of <100° C. and that is substantially free of undesirable constituents, for example free of monomeric, oligomeric or polymeric starting compounds used for the preparation of the prepolymer and/or free of secondary products formed during the preparation of the prepolymer, and that is substantially free of solvents, comonomers and other auxiliaries,
b) initiating the photocrosslinking for a period of ≦5 minutes, and
c) opening the mould, so that the moulding can be removed from the mould.

While in processes proposed in the prior art it is generally necessary for the removal of the moulding to be followed by purification steps, for example by extraction, such steps are unnecessary in the process according to the invention because the prepolymers used do not contain undesirable low-molecular-weight constituents; as a result, the crosslinked product is also free or substantially free of such constituents, and subsequent extraction can be omitted. The mouldings obtainable in accordance with the process of the invention, especially contact lenses, are accordingly suitable for their designated use without further processing.

The process according to the invention therefore proves to be extraordinarily suitable for the efficient production of a large number of mouldings, such as contact lenses, within a short time.

Further examples of mouldings that can be produced according to the invention, in addition to contact lenses, are biomedical and, especially, ophthalmic mouldings, for example intraocular lenses and eye dressings, mouldings for use in surgery, such as heart valves, artificial arteries or the like, and also films or membranes, for example membranes for controlling diffusion, photostructurable foils for information storage, or photoresist materials, for example membranes or mouldings for etching resist or screen printing resist.

When the moulding produced according to the invention is a contact lens, the lens can subsequently be converted into a ready-to-use contact lens in customary manner by hydration. Suitable forms of hydration, in which ready-to-use contact lenses of an extremely varied water content are obtainable, are known to the person skilled in the art. The contact lens is swelled, for example, in water, in an aqueous salt solution, especially in an aqueous salt solution having an osmolarity of approximately from 200 to 450 milliosmol in 1000 ml (unit: mosm/l), preferably approximately from 250 to 350 mosm/l and especially approximately 300 mosm/l, or in a mixture of water or an aqueous salt solution with a physiologically tolerable polar organic solvent, for example glycerol. The prepolymer is preferably swelled in water or in an aqueous salt solution.

The aqueous salt solutions used for the hydration are advantageously solutions of physiologically tolerable salts, such as the buffer salts customary in the field of contact lens care, for example phosphate salts, or the isotonicising agents customary in the field of contact lens care, such as especially alkali metal halides, for example sodium chloride, or solutions of mixtures thereof. An example of an especially suitable salt solution is a synthetic, preferably buffered, lachrymal fluid the pH value and osmolarity of which has been matched to natural lachrymal fluid, for example an unbuffered or, preferably, buffered, for example phosphate-buffer-buffered, sodium chloride solution, the osmolarity and pH value of which correspond to the osmolarity and pH value of human lachrymal fluid.

The hydration fluids defined above are preferably pure, that is to say free or substantially free of undesirable constituents. The hydration fluid is preferably pure water or a synthetic lachrymal fluid as described above.

As already mentioned, the process according to the invention provides an efficient method of producing contact lenses and is at the same time very versatile both in respect of the conditions for the crosslinking and in respect of the products obtainable. For example, the crosslinking can be effected using various mechanisms, for example radically but also cationically, and it is also possible to use polymer materials having a low degree of solubility in customary solvents, such as, for example, water, provided that they are swellable in water, and it is possible to produce ready-to-use contact lenses having either a low water content or a high water content, for example having a water content of >5%.

The contact lenses obtainable in accordance with the process of the invention also have advantageous properties and in that respect are at least equivalent to the lenses prepared by previously known processes. Of those properties, mention should be made, for example, of their excellent tolerability by the human cornea, which is based on a balance of water content, oxygen permeability and mechanical properties. Furthermore, the contact lenses according to the invention exhibit a high degree of dimensional stability.

In the following Examples, unless expressly indicated to the contrary, amounts are given in amounts by weight and temperatures are given in degrees Celsius. The Examples are not intended to limit the invention in any way, for example to the scope of the Examples.

EXAMPLE 1

1 g of polyethylene glycol-1000-dimethacrylate are mixed with 1.5 mg of Irgacure®2959 at 40° C. until a clear solution is obtained. A drop of the solution is placed between two glass plates having a 100 μ spacer and irradiated for 25 seconds with a Höhnle UV lamp. A clear film is obtained which swells in water. After a swelling time of about 2 hours, the water content of the swelled film is constant and is 40%.

EXAMPLE 2

0.5 g of polyethylene glycol-1000-dimethacrylate and 0.5 g of polyethylene glycol monomethacrylate are mixed with 1.5 mg of Irgacure®2959 at 50° C. until a clear solution is obtained. A drop of the solution is placed between two glass plates having a 100 μ spacer and irradiated for 30 seconds with a Höhnle UV lamp. A clear film is obtained which in water yields a hydrogel film having a water content of 42%.

EXAMPLE 3

0.5 g of polyethylene glycol-1000-dimethacrylate and 0.5 g of an epoxy-group-containing polyethylene glycol which corresponds to the formula

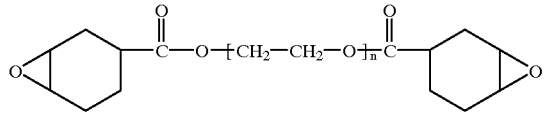

and in which n=23 are mixed with 20 mg of Cyracure® UVI 6974 (triarylsulfonium hexafluoroantimonate UCB) until a clear solution is obtained. A drop of the solution is placed between two glass plates having a 100 μ spacer and irradiated for 5 minutes with a Höhnle UV lamp. A clear film is obtained which in water yields a hydrogel film having a water content of about 40%.

What is claimed is:

1. A process for producing mouldings, comprising the following steps:
   a) introducing into a mould a prepolymer having a weight average molecular weight of from 1000 to 50000 and containing photocrosslinkable groups that is liquid at room temperature or is readily meltable and is substantially free of solvents and comonomers,
   b) initiating the photocrosslinking for a period of <5 minutes,
   c) opening the mould, so that the moulding can be removed from the mould.

2. A process according to claim 1, wherein the moulding is an ophthalmological moulding.

3. A process according to claim 1, wherein the polymer base structure of the prepolymer is a polyether, polyester, polyurea, polyurethane, polycarbonate or polyamide or a homogeneous mixture of two or more different mentioned polymers.

4. A process according to claim 1, wherein the polymeric base structure of the prepolymer is a polyether selected from the group consisting of a polyethylene glycol, a polypropylene glycol, a polyethylene glycol/polypropylene glycol block copolymer and a polytetrahydrofuran.

5. A process according to claim 4, wherein the prepolymer corresponds to formula

(4)

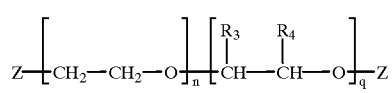

or (5)

wherein
one of the radicals $R_3$ and $R_4$ is hydrogen and the other is methyl, $R_5$ is hydrogen or $C_1$–$C_{30}$-alkyl, n and q are each independently of the other a number from 0 to 100, the sum of (n+q) being $\geq 5$, and Z is a photocrosslinkable group.

6. A process according to claim 5, wherein the photocrosslinkable groups correspond to formula $$P_1-(Y)_m-(R-X)_p-$$ (1)

wherein
$P_1$ is a radically crosslinkable group,
Y is the radical —CONHCOO—, —CONHCONH—, —OCONHCO—, —NHCONHCO—, —NHCO—, —CONH—, —NHCONH—, —COO—, —OCO—, —NHCOO— or —OCONH—,
m and p are each independently of the other the number 0 or 1,
R is the residue of a divalent organic compound having from 1 to 20 carbon atoms, and
X is the radical —NHCO—, —CONH—, —NHCONH—, —COO—, —OCO—, —NHCOO— or —OCONH—.

7. A process according to claim 6, wherein $P_1$ is alkenyl having up to 4 carbon atoms, Y is —COO— or —CONH—, R is alkylene having up to 4 carbon atoms, X is —NHCOO— and m and p are each independently of the other 0 or 1, the sum of (m+p) being $\geq 1$.

8. A process according to claim 1, wherein the photocrosslinkable groups are cationically crosslinkable groups selected from the group consisting of epoxy, vinyl ether, propenyl ether, spiroorthoester and spiroorthocarbonate groups and cyclic carbonates.

9. A process according to claim 1, wherein the prepolymer containing crosslinkable groups is free or substantially free of undesirable monomeric, oligomeric or polymeric starting compounds used for the preparation of the prepolymer or of secondary products formed during the preparation of the prepolymer.

10. A process according to claim 1, wherein the photocrosslinking is carried out in the presence of a photoinitiator.

11. A process according to claim 1, wherein the photocrosslinking of the prepolymer is carried out in a period of ≦1 minute.

12. A process according to claim 1, wherein extraction to remove undesirable constituents is omitted after the crosslinking.

13. A process according to claim 1, comprising the following steps:
   a) introducing into a mould, together with a photoinitiator, a prepolymer that is liquid at room temperature or has a melting point of <100° C. and that is substantially free of undesirable monomeric, oligomeric or polymeric starting compounds used for the preparation of the prepolymer and/or free of secondary products formed during the preparation of the prepolymer, and that is substantially free of solvents, comonomers and other auxiliaries,
   b) initiating the photocrosslinking for a period of ≦5 minutes, and
   c) opening the mould, so that the moulding can be removed from the mould.

14. A process for producing a hydrogel, wherein a moulding obtained in accordance with claim 1 is subjected to swelling in aqueous solution.

15. A process according to claim 14, wherein the hydrogel is a contact lens.

16. A process according to claim 14, wherein the aqueous solution is a purely aqueous solution or a solution in a synthetic lachrymal fluid.

17. An ophthalmological moulding obtained by the process according to claim 1.

18. A process according to claim 1, wherein the moulding is a contact lens.

19. A process for producing mouldings, comprising the following steps:
   a) introducing into a mould a prepolymer and containing photocrosslinkable groups that is liquid at room temperature or is readily meltable and is substantially free of solvents, wherein the photocrosslinkable groups are cationically crosslinkable groups selected from the group consisting of epoxy, vinyl ether, propenyl ether, spiroorthoester and spiroorthocarbonate groups and cyclic carbonates,
   b) initiating the photocrosslinking for a period of <20 minutes,
   c) opening the mould, so that the moulding can be removed from the mould.

20. A process for producing mouldings, comprising the following steps:
   a) introducing into a mould a prepolymer and containing photocrosslinkable groups that is liquid at room temperature or is readily meltable and is substantially free of solvents,
   b) initiating the photocrosslinking for a period of <20 minutes,
   c) opening the mould, so that the moulding can be removed from the mould
   d) swelling the moulding in an aqueous solution selected from the group consisting of a purely aqueous solution and a synthetic lachrymal fluid.

* * * * *